United States Patent
Iba

(10) Patent No.: US 12,357,912 B2
(45) Date of Patent: Jul. 15, 2025

(54) COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD

(71) Applicant: Nintendo Co., Ltd., Kyoto (JP)

(72) Inventor: Keisuke Iba, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 422 days.

(21) Appl. No.: 17/959,907

(22) Filed: Oct. 4, 2022

(65) Prior Publication Data
US 2023/0302360 A1    Sep. 28, 2023

(30) Foreign Application Priority Data

Mar. 25, 2022   (JP) .................................. 2022-049677

(51) Int. Cl.
*A63F 13/56*    (2014.01)
*A63F 13/573*   (2014.01)
*A63F 13/812*   (2014.01)

(52) U.S. Cl.
CPC ............ *A63F 13/56* (2014.09); *A63F 13/573* (2014.09); *A63F 13/812* (2014.09); *A63F 2300/646* (2013.01); *A63F 2300/6607* (2013.01); *A63F 2300/8011* (2013.01)

(58) Field of Classification Search
CPC ...... A63F 13/56; A63F 13/573; A63F 13/812; A63F 2300/646; A63F 2300/6607; A63F 2300/8011
See application file for complete search history.

(56) References Cited

U.S. PATENT DOCUMENTS

| 12,145,058 | B2* | 11/2024 | Lehtiniemi | ............. A63F 13/48 |
| 2008/0113810 | A1* | 5/2008 | Kubota | .................. A63F 13/30 463/42 |
| 2011/0153734 | A1 | 6/2011 | Kawakami et al. | |

(Continued)

FOREIGN PATENT DOCUMENTS

| JP | 2010-134800 | 6/2010 |
| JP | 2011-143104 | 7/2011 |

(Continued)

OTHER PUBLICATIONS

Sixaxis https://en.wikipedia.org/w/index.php?title=Sixaxis&oldid=1037196800 (Year: 2021).*

*Primary Examiner* — Kang Hu
*Assistant Examiner* — Ross A Williams
(74) *Attorney, Agent, or Firm* — Nixon & Vanderhye PC

(57) ABSTRACT

In a first case, the movement speed of a movement object is reduced on the basis of a first correction value that is calculated on the basis of a delay time and that is changed in accordance with an elapsed time from start of movement of the movement object, to move the movement object. In a second case, the movement speed of the movement object is reduced on the basis of a second correction value that is calculated on the basis of the delay time and that is not changed in accordance with an elapsed time from start of movement of the movement object, to move the movement object.

20 Claims, 15 Drawing Sheets

(56) References Cited

U.S. PATENT DOCUMENTS

| | | | | |
|---|---|---|---|---|
| 2016/0243441 | A1* | 8/2016 | Garbowski | A63F 13/65 |
| 2017/0259174 | A1* | 9/2017 | Fiedler | H04L 67/08 |
| 2018/0341335 | A1 | 11/2018 | Hinoshita et al. | |
| 2018/0341339 | A1 | 11/2018 | Ogura et al. | |

FOREIGN PATENT DOCUMENTS

| | | |
|---|---|---|
| JP | 2018-196578 | 12/2018 |
| JP | 2019-196578 | 12/2018 |
| JP | 2019-005534 | 1/2019 |
| JP | 2020-146441 | 9/2020 |
| JP | 2022-017984 | 1/2022 |

\* cited by examiner

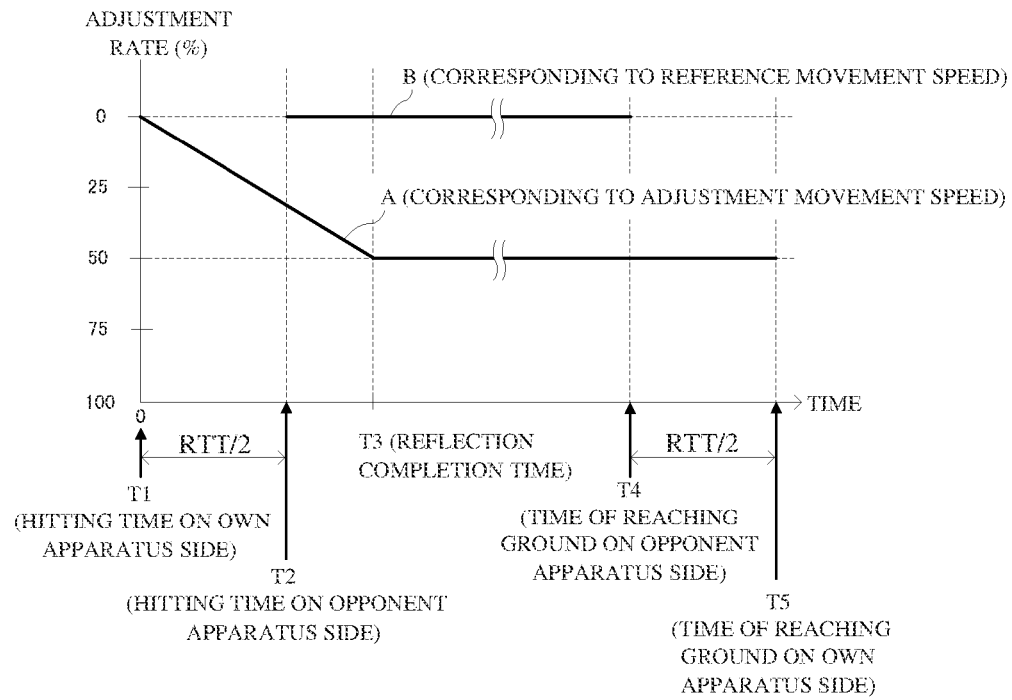
FIG. 13    CASE OF CLEAR, LOB, SMASH, etc.
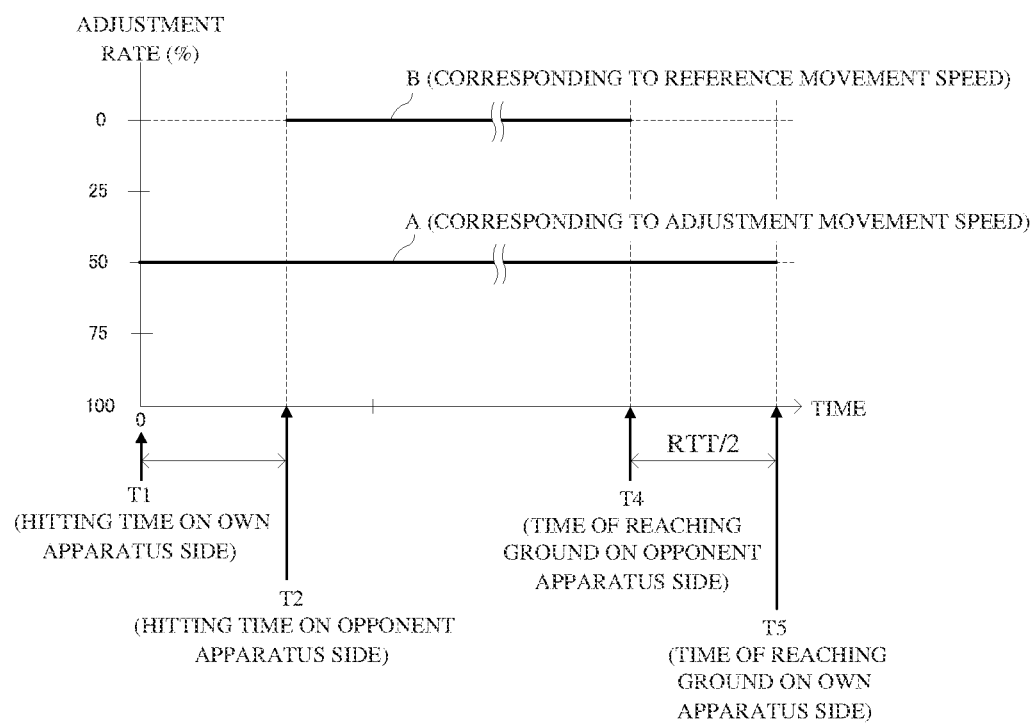
FIG. 14    CASE OF MISS SHOT AND SUPER SMASH

COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2022-49677 filed on Mar. 25, 2022, the entire contents of which are incorporated herein by reference.

FIELD

The present disclosure relates to information processing such as a sports game.

BACKGROUND AND SUMMARY

To date, game processing in which, while the game states of an own apparatus and an opponent apparatus are synchronized with each other, the position of an object is moved has been known.

When synchronization of game states is performed as in the game processing described above, it is conceivable to adopt a method in which correction is performed so as to reduce the movement speed of an object in an own apparatus in accordance with a communication delay time between the own apparatus and an opponent apparatus, thereby realizing synchronization between the own apparatus and the opponent apparatus. However, when correction is performed such that the movement speed is uniformly reduced, a user may have a feeling of strangeness with respect to the movement of the object.

Therefore, an object of the exemplary embodiment is to provide a computer-readable non-transitory storage medium having stored therein an information processing program that can, when the movement speed of an object in an own apparatus is reduced to realize synchronization between the own apparatus and the opponent apparatus, prevent occurrence of a feeling of strangeness with respect to movement of the object, an information processing system, an information processing apparatus, and an information processing method.

Configuration examples for achieving the above object will be shown below.

An example of configuration 1 is a computer-readable non-transitory storage medium having stored therein instructions that, when executed by a processor of a first information processing apparatus, cause the first information processing apparatus to perform the following operations. The operations include: communicating with a second information processing apparatus; controlling, in a virtual space, an own character object controlled on the basis of an operation data acquired from at least one operation device which is related to the first information processing apparatus, an opponent character object controlled on the basis of data received from the second information processing apparatus, and a movement object; calculating a delay time in communication with the second information processing apparatus; when the operation data acquired from the operation device satisfies a predetermined condition, causing the own character object to execute a first action with respect to the movement object in the virtual space and starting movement of the movement object, on the basis of the operation data; in a first case, on the basis of a first correction value that is calculated on the basis of the delay time and that is changed in accordance with a time having elapsed from when the movement of the movement object has been started, reducing a movement speed of the movement object of which the movement has been started, to move the movement object, and in a second case, on the basis of a second correction value that is calculated on the basis of the delay time and that is not changed in accordance with a time having elapsed from when the movement of the movement object has been started, reducing the movement speed of the movement object to move the movement object; and on the basis of data received from the second information processing apparatus, causing the opponent character object to execute a second action with respect to the movement object that is being moved.

According to the above configuration, there are a case where the movement speed of the movement object is adjusted so as to be reduced on the basis of a first correction value that is changed in accordance with an elapsed time from start of movement of the movement object, and a case where the movement speed of the movement object is adjusted so as to be reduced on the basis of a second correction value that is not changed in accordance with the elapsed time. Therefore, occurrence of a feeling of strangeness with respect to movement of the movement object can be prevented.

In an example of configuration 2, in the example of the above configuration 1, speed reduction may be performed on the movement object such that a reduction amount of the movement speed of the movement object is increased in accordance with increase in the delay time.

According to the above configuration, a time necessary for waiting for a response from the second information processing apparatus can be ensured.

In an example of configuration 3, in the example of the above configuration 1, speed reduction may be performed, in the first case, on the movement object by changing the first correction value on the basis of a reflection rate that is changed in accordance with a time having elapsed from when the movement of the movement object has been started.

According to the above configuration, gradual speed reduction adjustment on the movement object can be performed on the basis of the reflection rate.

In an example of configuration 4, in the example of the above configuration 1, the first correction value may be changed, until a predetermined timing, such that the movement speed of the movement object is more reduced in accordance with a lapse of time, and is fixed after the predetermined timing.

According to the above configuration, the original movement speed of the movement object can be reduced to a movement speed at a desired proportion before the predetermined timing. Therefore, a time necessary for waiting for a response from the second information processing apparatus can be ensured earlier.

In an example of configuration 5, in the example of the above configuration 4, calculating an arrival time that is taken until the movement object of which the movement has been started reaches a predetermined position may be performed, and the first correction value may be changed in accordance with a lapse of time until the predetermined timing calculated on the basis of the arrival time, and may be fixed after the predetermined timing.

According to the above configuration, the original movement speed of the movement object can be reduced to a movement speed at a desired proportion, before the predetermined timing calculated on the basis of an arrival time that is taken until the movement object reaches the predetermined position.

In an example of configuration 6, in the example of the above configuration 1, in the first case, a first movement speed of the movement object, the first movement speed decreasing in accordance with a lapse of time, may be further reduced on the basis of the first correction value, and in the second case, a second movement speed of the movement object, the second movement speed decreasing in accordance with a lapse of time, may be further reduced on the basis of the second correction value.

According to the above configuration, it is possible to perform adjustment of further reducing each of the first movement speed and the second movement speed which decrease in accordance with a lapse of time.

In an example of configuration 7, in the example of the above configuration 6, the first movement speed in the first case may be set to be slower than the second movement speed in the second case, and then, the second movement speed may be reduced on the basis of the second correction value.

According to the above configuration, since the second movement speed in the second case is (relatively) fast, speed adjustment can be performed without causing a feeling of strangeness even when the second movement speed is uniformly changed on the basis of the second correction value in the second case.

In an example of configuration 8, in the example of the above configuration 6, the second movement speed in the second case may be set to be slower than the first movement speed in the first case, and then, the second movement speed may be reduced on the basis of the second correction value.

According to the above configuration, since the second movement speed in the second case is (relatively) slow, speed adjustment can be performed without causing a feeling of strangeness even when the second movement speed is uniformly changed on the basis of the second correction value in the second case.

In an example of configuration 9, in the example of the above configuration 1, the operation device may include an inertial sensor, and the operation data may include data based on an output from the inertial sensor.

According to the above configuration, an operation can be performed by moving the operation device itself.

In an example of configuration 10, in the example of the above configuration 1, executing a badminton game may be performed.

According to the above configuration, in a badminton game in which after the movement object has started moving and then the speed of the movement object rapidly decreases, occurrence of a feeling of strangeness with respect to movement of the movement object can be prevented.

In an example of configuration 11, in the example of the above configuration 1, the movement of the movement object may be started toward a movement path determined on the basis of the operation data, and the movement object may be moved along the movement path while the movement speed of the movement object is reduced.

According to the exemplary embodiment, in a case where an own apparatus is synchronized with an opponent apparatus by reducing the movement speed of an object in the own apparatus, occurrence of feeling of strangeness with respect to movement of the object can be prevented.

These and other objects, features, aspects, and effects of the exemplary embodiment will become more apparent from the following detailed description of non-limiting example embodiments when taken in conjunction with the accompanying drawings.

BRIEF DESCRIPTION OF THE DRAWINGS

FIG. 13 is a diagram for describing a non-limiting example of a relationship between lapse of time and adjustment rate of the movement speed of the shuttle;

FIG. 14 is a diagram for describing a non-limiting example of a relationship between lapse of time and adjustment rate of the movement speed of the shuttle;

DETAILED DESCRIPTION OF NON-LIMITING EXAMPLE EMBODIMENTS

Hereinafter, an exemplary embodiment will be described.
[Hardware Configuration of Information Processing System]

Hereinafter, an information processing system (game system) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
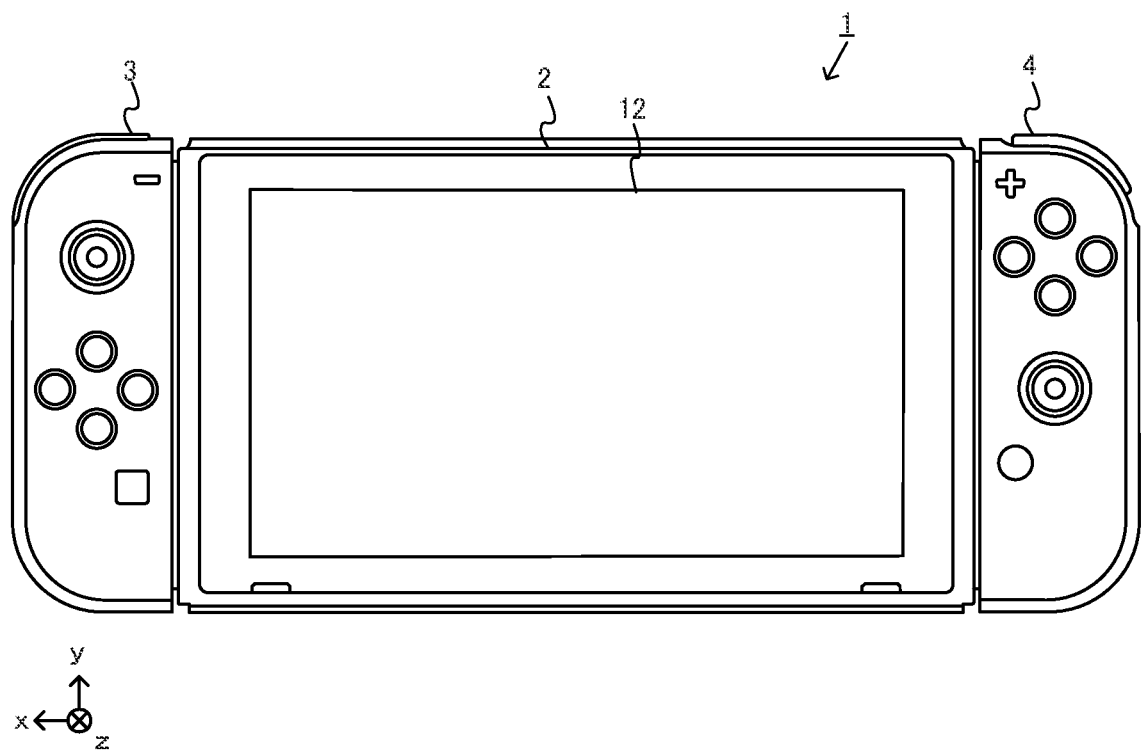
FIG. 1 shows a non-limiting example of a state where a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
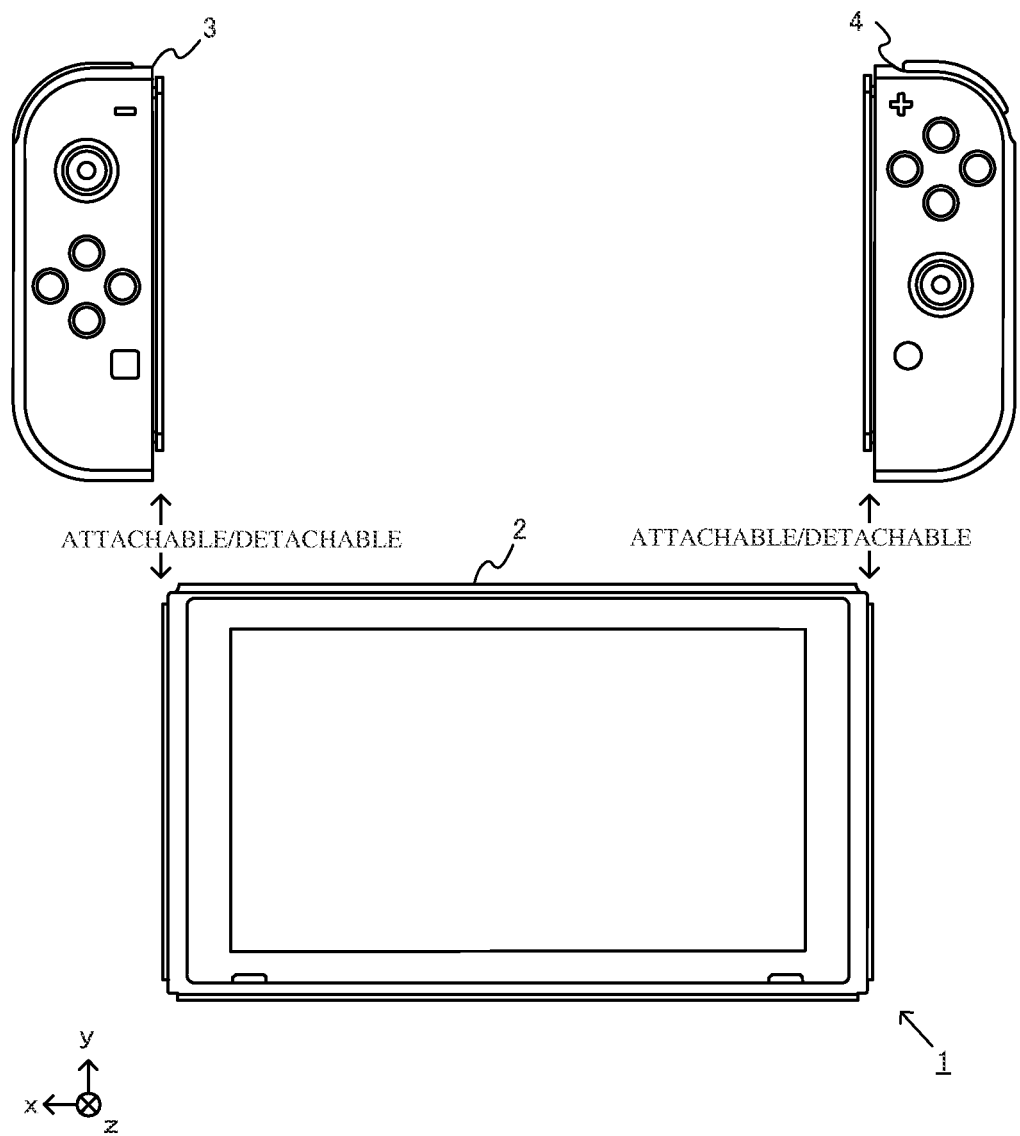
FIG. 2 shows a non-limiting example of a state where the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as a "controller".

Figure 3:
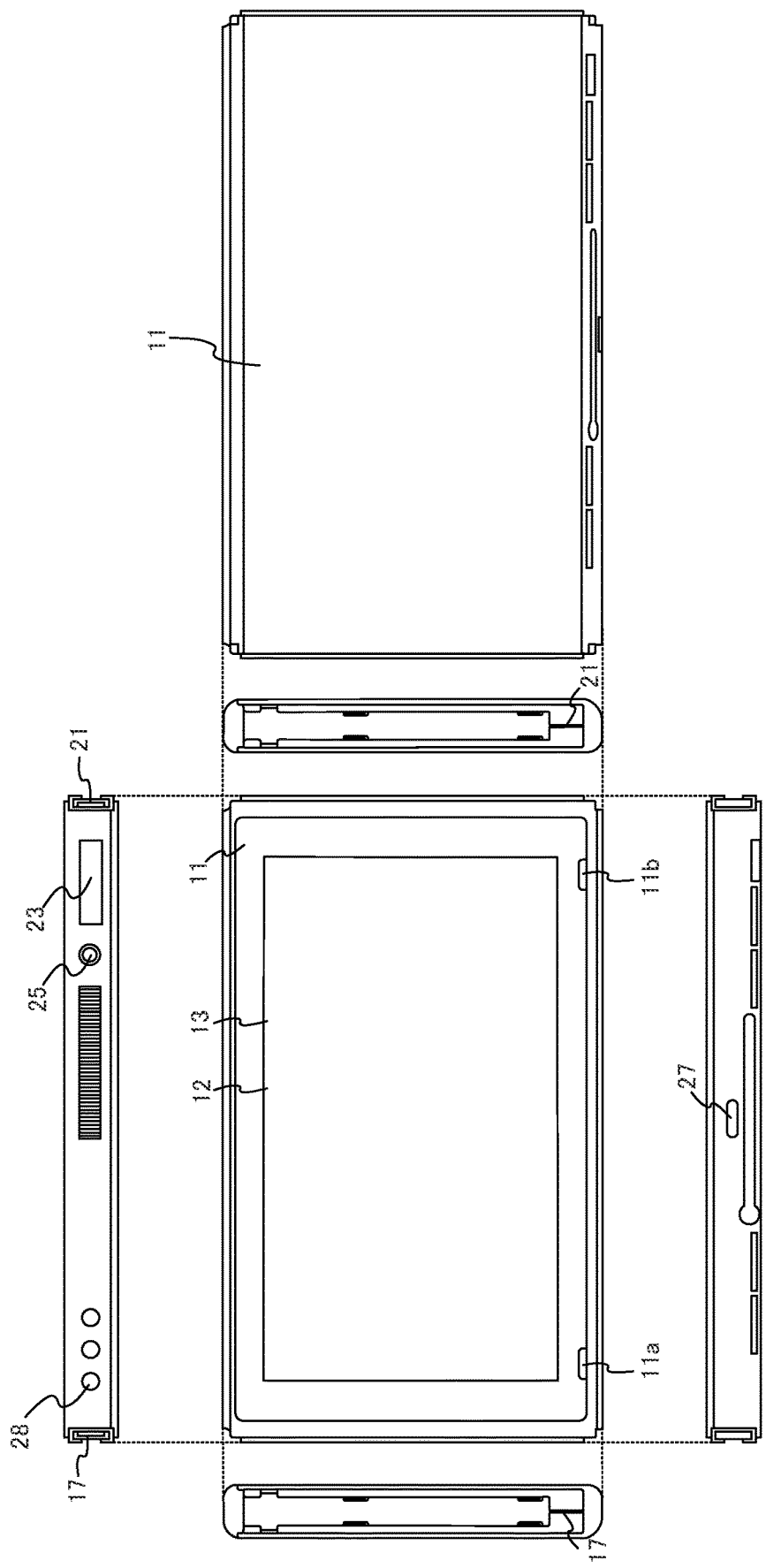
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

It should be noted that the shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single touch input (e.g., resistive film type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). When the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
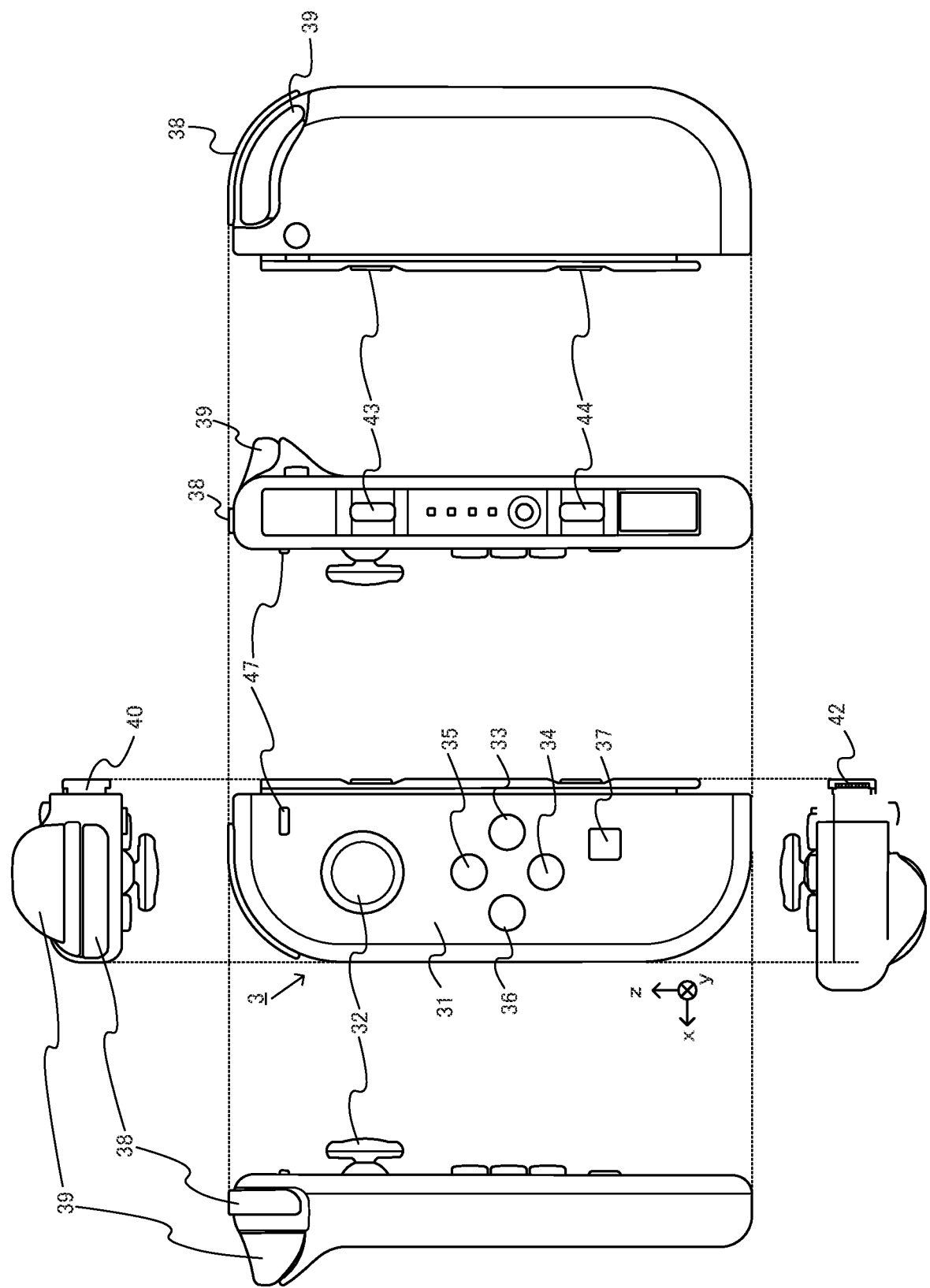
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (a z-axis direction shown in FIG. 4) in FIG. 4. In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32, which is an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
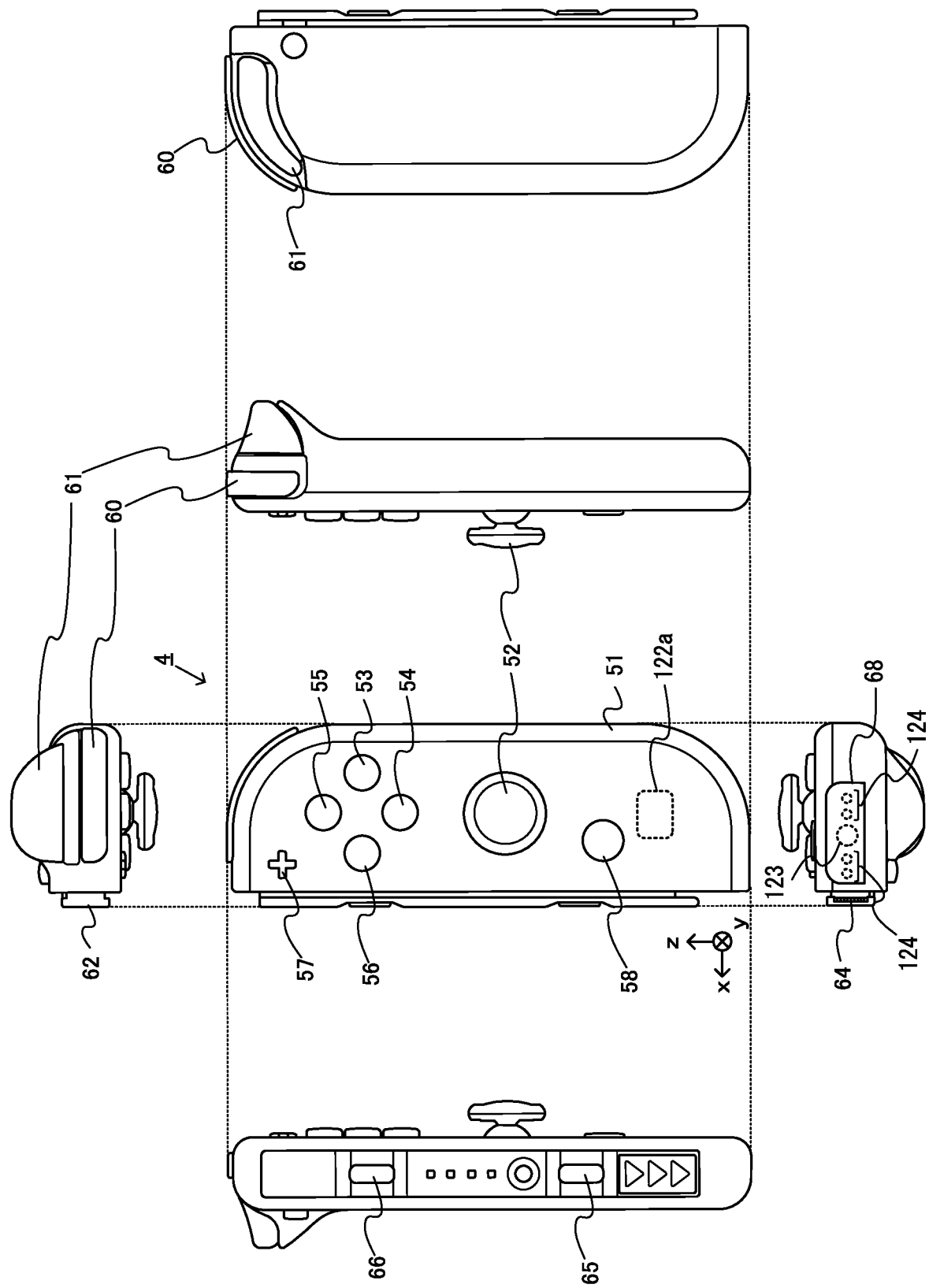
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction (the z-axis direction shown in FIG. 5) in FIG. 5. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly, the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
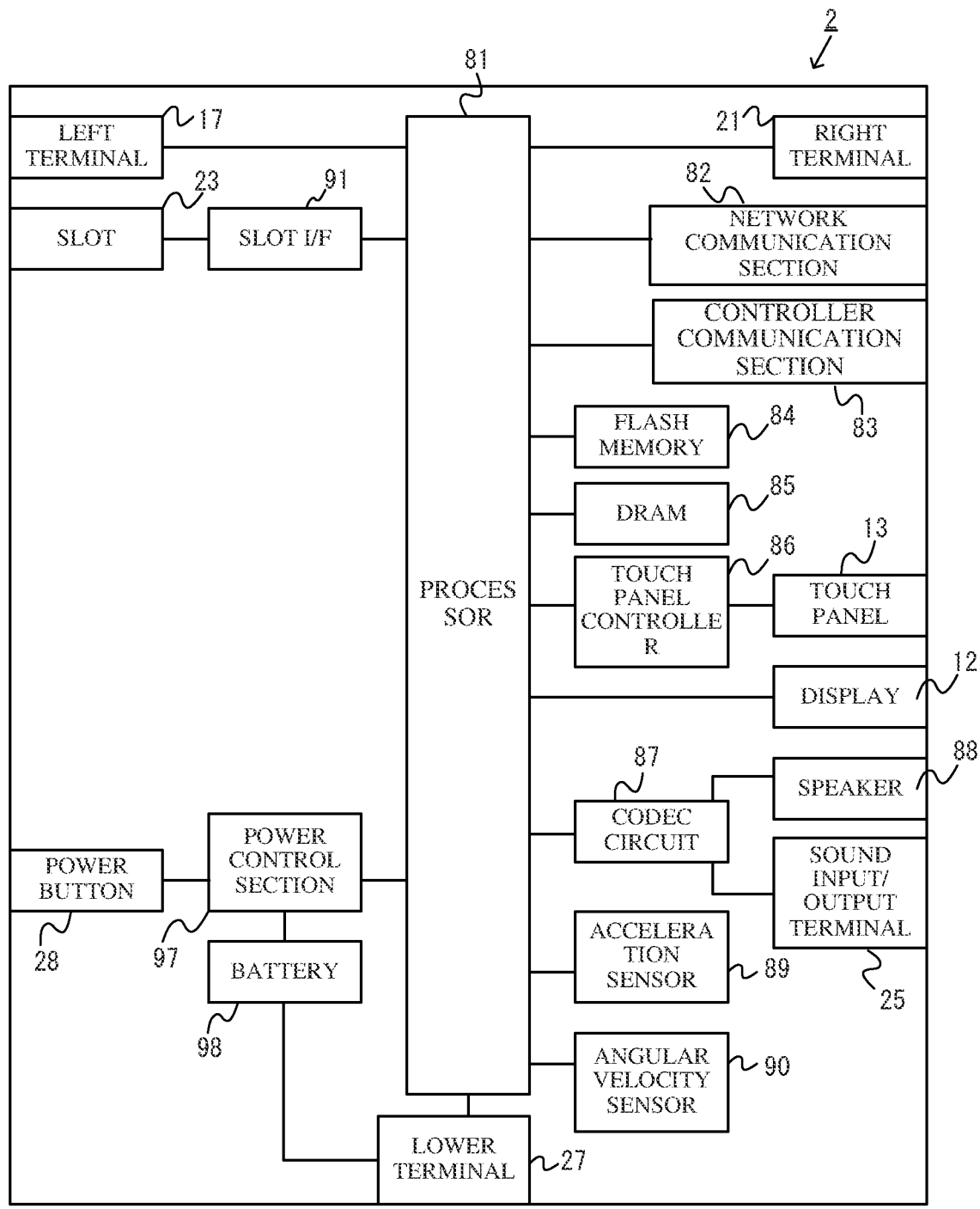
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
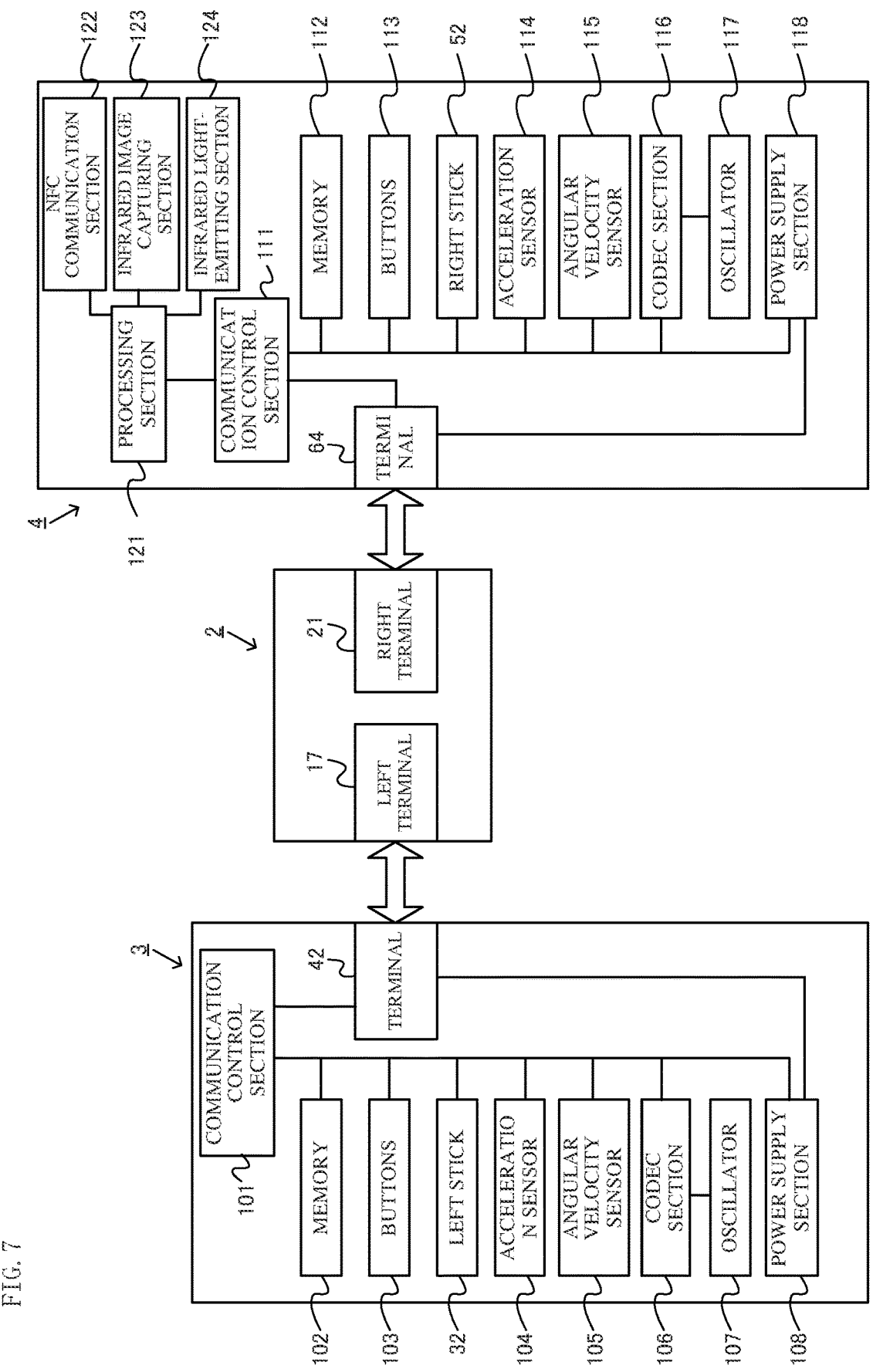
FIG. 7 is a block diagram showing a non-limiting example of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation, or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Outline of Game Processing in the Exemplary Embodiment

Next, an outline of operation of game processing executed in the game system 1 according to the exemplary embodiment will be described. As described above, in the game system 1, the left controller 3 and the right controller 4 are attachable to and detachable from the main body apparatus 2. When a game is played in a state where the left controller 3 and the right controller 4 are attached to the main body apparatus 2, the game image is outputted to the display 12. When the main body apparatus 2 alone in a state where the left controller 3 and the right controller 4 are detached from the main body apparatus 2 is attached to the cradle, the main body apparatus 2 can also output the game image to a stationary monitor or the like via the cradle. In the exemplary embodiment, an example case where game play is performed in the latter form will be described. Specifically, in this form, the main body apparatus 2 alone in a state where the left controller 3 and the right controller 4 are detached from the main body apparatus 2 is attached to the cradle, and the main body apparatus 2 outputs the game image and the like to a stationary monitor or the like via the cradle. A case where a right-handed player plays a game while holding the right controller 4 in the right hand is assumed. In the exemplary embodiment, the left controller 3 is not used. However, for example, when the player is left-handed, the following processes as described below may be performed in a form where the left controller 3 is used instead of the right controller 4.

Game Assumed in the Exemplary Embodiment

Figure 8:
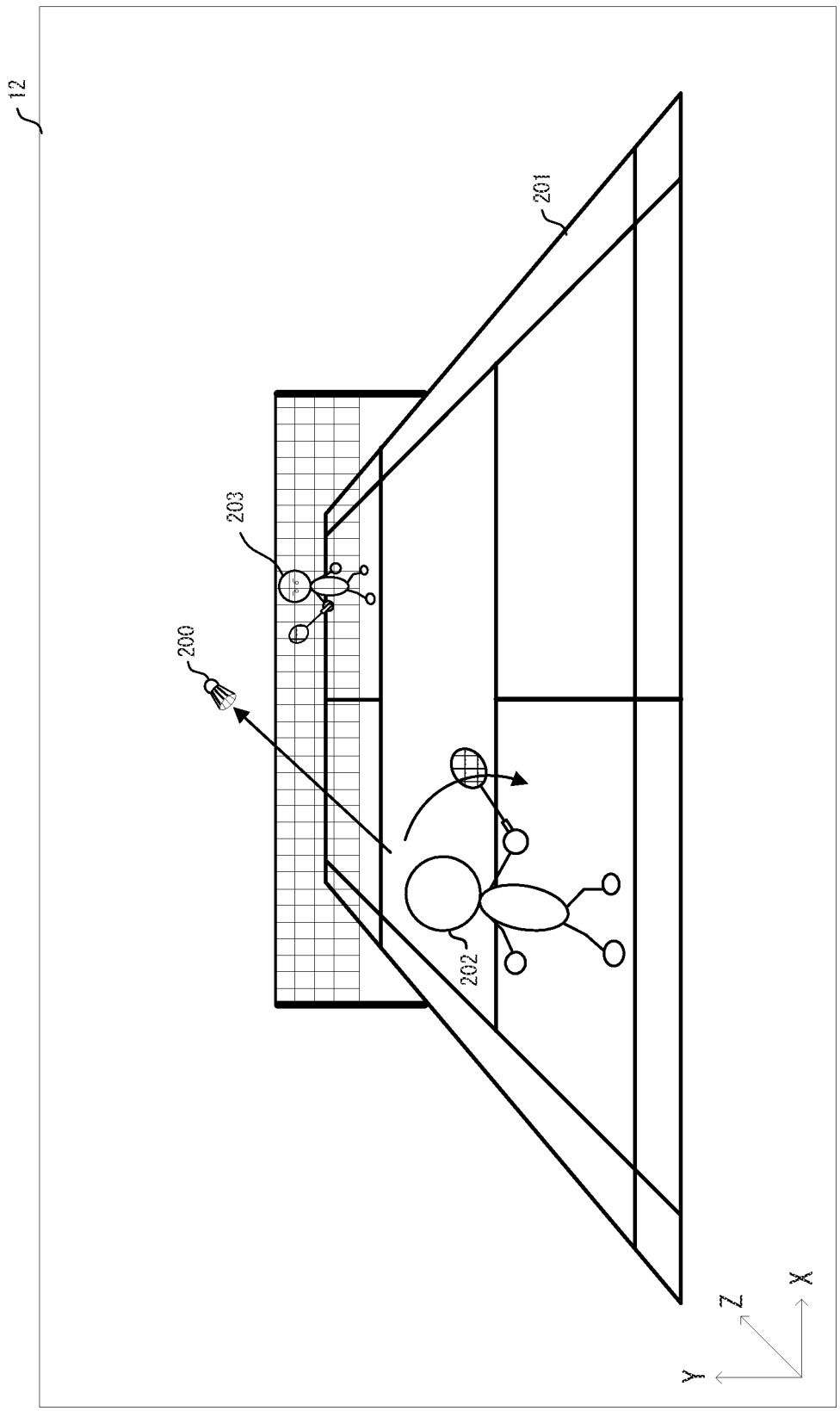
FIG. 8 is a diagram for describing a non-limiting example of an outline of this game.

Next, an outline of game processing (an example of information processing) executed in the game system 1 according to the exemplary embodiment will be described. First, as shown in FIG. 8, the game assumed in the exemplary embodiment is a badminton game of which the motif is singles badminton, as an example. Specifically, in this game, two athlete character objects (which may be referred to as "characters"), which are virtual human-type objects, are respectively placed, one by one, in an own-side court and opponent-side court of a badminton court prepared in a virtual space, and a badminton game is performed.

This game can be played by two users via a network such as the Internet or through short-range wireless communication. In the exemplary embodiment, a case where one user is in charge of one character and operates the character is assumed. It should be noted that, when there is no opponent user, an opponent character is automatically operated by a computer.

Outline of Game Processing in the Exemplary Embodiment

Next, an outline of game processing executed in the game system 1 according to the exemplary embodiment will be described. As shown in FIG. 8, in this game, a part of a ground object placed in the virtual space serves as a badminton court 201. In the badminton court 201, a character object (which may be referred to as "own character") 202 operated by a user is placed in the own-side court, and an opponent character object (which may be referred to as "opponent character2) 203 is placed in the opponent-side court. Then, the own character 202 and the opponent character 203 hit a shuttle object (movement object: which may be referred to as "shuttle") 200 with badminton rackets (which may be referred to as "rackets") with each other, whereby a badminton game progresses. In this game, a character (the own character 202, the opponent character 203) is automatically moved by the computer to a position where the character should hit the shuttle 200 (a position that satisfies a predetermined positional relationship in which the character can hit the shuttle), and the user (player) performs an operation of swinging the held right controller 4 at an appropriate timing (e.g., at a timing in a period where the positional relationship is satisfied), to cause the character to perform a motion of swinging the racket, thereby being able to hit the shuttle. It should be noted that, instead of an operation of swinging the right controller 4, an operation of pressing a predetermined button of the right controller 4 may be performed to cause the character to perform a motion of swinging the racket, thereby hitting the shuttle.

A virtual camera placed in the virtual space captures an image, while looking down from above and behind of the own character 202, such that a region including the badminton court 201 is included in the imaging range, thereby generating a game image as shown in FIG. 8. The virtual camera moves in the left-right direction in accordance with movement (movement in the X-axis direction in FIG. 8) in the left-right direction of the own character 202, to capture the virtual space from above and behind the own character 202.

Figure 9:
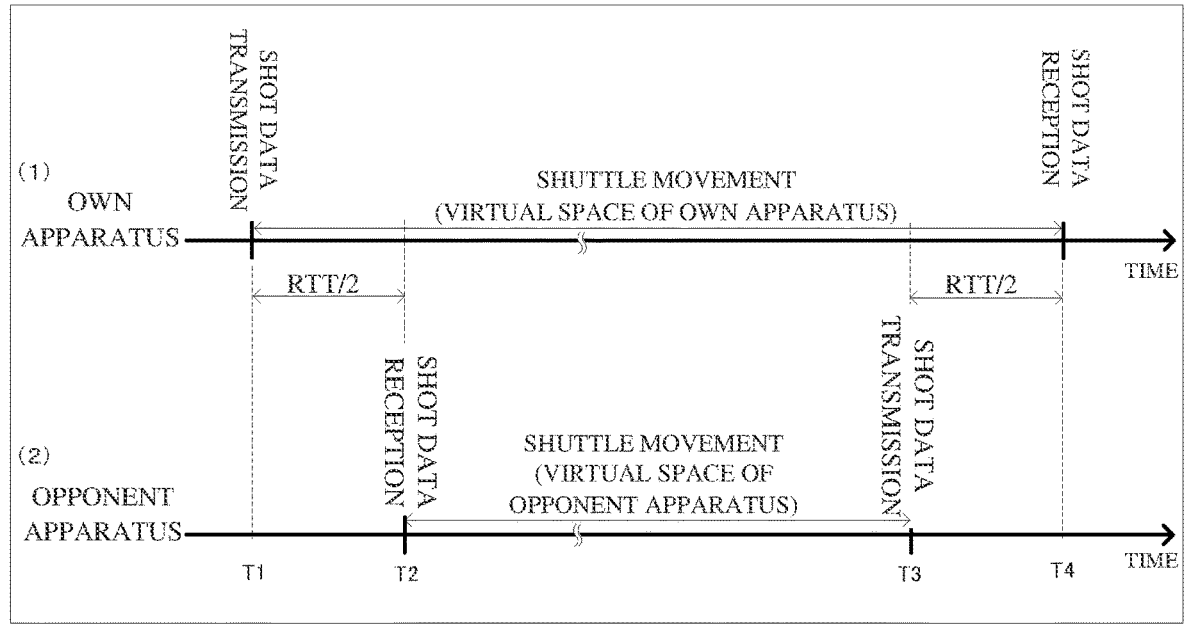
FIG. 9 is a diagram for describing a non-limiting example of communication delay and the like in a case where an own character has hit a shot.

FIG. 9 is a communication timing chart for describing communication delay between the game system 1 (which may be referred to as "own apparatus") operated by the user and the game system 1 (which may be referred to as "opponent apparatus") operated by an opponent user. Hereinafter, with reference to FIG. 9, a case where the own character 202 hits a shot toward the opponent-side court through an operation by the user in the own apparatus and the opponent character 203 hits back the shot toward the own-side court through an operation by the opponent user in the opponent apparatus, will be described.

First, as shown in FIG. 9, at T1, when the own character 202 has hit a shot in the virtual space (game space) of the own apparatus toward the opponent-side court, movement of the shuttle 200 is started in the virtual space of the own apparatus, and shot data indicating that the own character 202 has hit a shot is transmitted to the opponent apparatus. Here, in such a case where the communication is performed via the Internet, a round-trip time (which may be referred to as "RTT") in the communication between the own apparatus and the opponent apparatus occurs or the round-trip time may be long in some cases. Therefore, as shown in FIG. 9, the shot data transmitted from the own apparatus at T1 is received by the opponent apparatus at T2, and movement of the shuttle 200 is started in the virtual space of the opponent apparatus. Then, at T3, when the opponent character 203 (an own character 202 for the opponent apparatus) has hit back the shuttle 200 through an operation by the opponent user in the virtual space of the opponent apparatus, shot data indicating that the opponent character 203 has hit a shot is transmitted to the own apparatus. Then, due to influence of the RTT, the shot data transmitted from the opponent apparatus is received by the own apparatus at T4.

Figure 10:
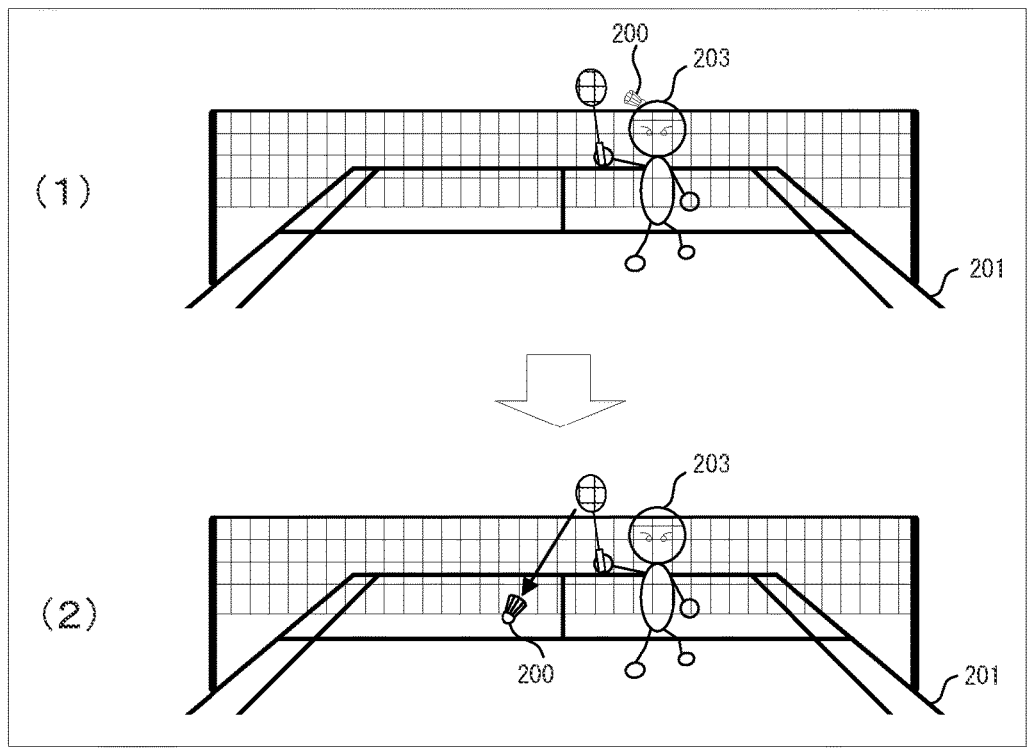
FIG. 10 is a diagram for describing a non-limiting example of a badminton game image.

Here, as shown in FIG. 9, the time (the period from T1 to T4) in which the shuttle 200 moves in the virtual space of the own apparatus is longer than the time (the period from T2 to T3) in which the shuttle 200 moves in the virtual space of the opponent apparatus. Therefore, when the movement speed of the shuttle 200 in the virtual space of the own apparatus and the movement speed of the shuttle 200 in the virtual space of the opponent apparatus are the same, unnatural display may be performed in the game image in the own apparatus. FIG. 10 is a diagram for describing display of an unnatural game image that could be caused in the own apparatus in such a case.

First, as shown in (1) of FIG. 10, since the movement speed of the shuttle 200 is the same as the movement speed of the shuttle 200 in the virtual space of the opponent apparatus, display in which the shuttle 200 has passed through the position of the opponent character 203 and the opponent character 203 has failed to hit back the shot is performed in the virtual space (game image) of the own apparatus. Then, at T3 in FIG. 10, the shuttle 200 is hit back by the opponent character 203. Then, in the virtual space of the own apparatus, as shown in (2) of FIG. 10, the opponent character 203, which should not have been able to hit back the shot, hits back the shot in some cases.

Therefore, in this game processing, in the virtual space of the own apparatus, in accordance with the length of the RTT, a correction rate for reducing the speed of the shuttle 200 hit by the own character 202 from the original movement speed (which may be referred to as "reference movement speed") is determined. With respect to a specific shot (a miss shot and a super smash described later), adjustment is performed such that, in the entire period from when the shuttle 200 has been hit to when the shuttle 200 reaches the ground in the court, the correction rate is uniformly reflected in the reference movement speed, and the movement speed of the shuttle 200 is reduced at a uniform proportion with respect to the reference movement speed. Meanwhile, with respect to shots (a clear, a lob, a smash, and the like described later) other than the specific shot, from when the shuttle 200 has been hit till a timing (predetermined timing) at which a predetermined time elapses, a reflection rate for gradually reflecting the correction rate to the reference movement speed is used to reflect the correction rate to the reference movement speed, and the correction rate is completely reflected in the end. Then, adjustment is performed such that, in a period until the shuttle 200 reaches the ground (arrives at a predetermined position), with the completely reflected correction rate fixed, the movement speed of the shuttle 200 is reduced at a uniform proportion with respect to the reference movement speed. In the following, specific description will be given with reference to FIG. 11 to FIG. 14.

Figure 11:
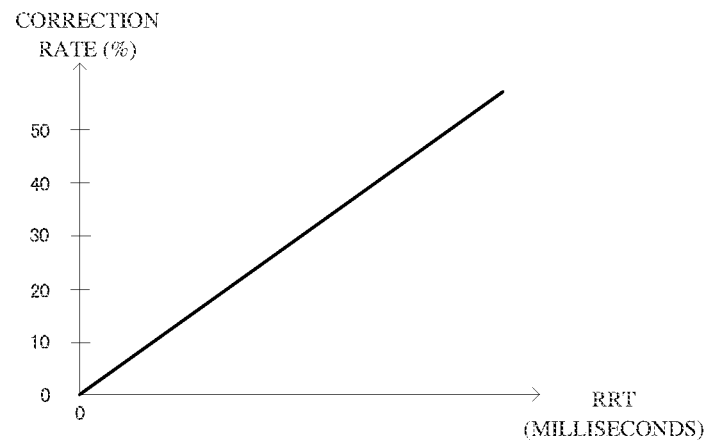
FIG. 11 is a diagram for describing a non-limiting example of a relationship between communication delay time (RTT) and correction rate of the movement speed of a shuttle.

FIG. 11 is an example of a graph showing a relationship between the RTT and the correction rate. The correction rate is a parameter that indicates how slowly the shuttle 200 hit by the own character 202 is moved with respect to the original movement speed (reference movement speed) in the virtual space (game image) of the own apparatus. The original movement speed (reference movement speed) can be said to be the movement speed of the shuttle 200 at the time when there is no communication delay (i.e., a badminton game is performed off line, by using short-range wireless communication or the like). As shown in FIG. 11, the correction rate increases linearly (in a straight-line manner) in accordance with increase in the RTT. For example, when the RTT is 400 milliseconds, the correction rate is 50%. The correction rate may increase in a curved manner in accordance with increase in the RTT. For example, the correction rate may increase in the form of a curve in which the slope is small at first and the slope gradually increases in accordance with increase in the RTT. Alternatively, the correction rate may increase in the form of a curve in which the slope is large at first and the slope gradually decreases in accordance with increase in the RTT.

Figure 12:
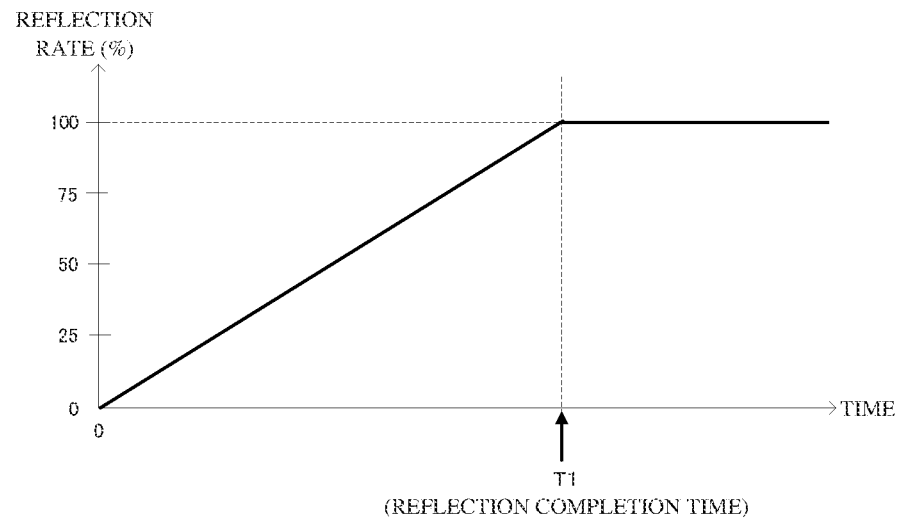
FIG. 12 is a diagram for describing a non-limiting example of a relationship between lapse of time and reflection rate reflecting the correction rate.

FIG. 12 is an example of a graph showing a relationship between a lapse of time and the reflection rate. The reflection rate is a parameter for gradually reflecting the correction rate, in accordance with a lapse of time, to the original movement speed (reference movement speed) of the shuttle 200 in the virtual space (game image) of the own apparatus. As shown in FIG. 12, the reflection rate increases linearly (in a straight-line manner) in accordance with a lapse of time so as to become 100% by T1 (reflection completion time). Here, T1 (reflection completion time) is a time at a predetermined proportion of the time (which may be referred to as "flight time" or "arrival time") from when the shuttle 200 has been hit to when the shuttle 200 reaches the ground, in the virtual space of the own apparatus. T1 (reflection completion time) is, for example, a time until the shuttle 200 reaches a position (e.g., near the net) where the opponent character 203 can hit back the shuttle 200, and is a time of 40% of the flight time, for example. The reflection rate may increase in a curved manner in accordance with a lapse of time. For example, the reflection rate may increase in the form of a curve in which the slope is large at first and the slope gradually decreases in accordance with increase in the RTT. Alternatively, the reflection rate may increase in the form of a curve in which the slope is small at first and the slope gradually increases in accordance with increase in the RTT.

FIG. 13 is an example of a graph for describing adjustment in which the speed of a shot (i.e., a clear, a lob, a smash, or the like), other than a miss shot and a super smash, hit by the own character 202 is reduced with respect to the original movement speed (reference movement speed), in the virtual space (game image) of the own apparatus. Here, similar to real badminton, the reference movement speed is a speed that is fast immediately after the shuttle 200 has been hit, and then, greatly decreases.

A clear is a shot hit by an overhand stroke (i.e., the racket is swung down), and is a shot hit high toward the depth of the opponent-side court. A lob (lobbing) is a shot hit by an underhand stroke (i.e., the racket is swung up), and is a shot in which the shuttle is hit back high. A smash is a shot hit by an overhand stroke, and is a shot aiming at getting a point by strongly hitting the shuttle at a high hitting point, down to the opponent-side court. A miss shot is a shot that moves in a shape of an arch at a slow speed when the shot hitting timing has not been appropriate but a shot has barely been able to be hit (when the interval between the own character 202 and the shuttle 200 has been large to some extent). A super smash is a smash hitting back a miss shot hit by the opponent character 203, and is a still faster shot than a smash. Here, the magnitude relationship between the movement speeds of the shots is miss shot<clear≤lob<smash<super smash.

As shown in FIG. 13, the horizontal axis of the graph is time, and the vertical axis is adjustment rate. The adjustment rate is a parameter obtained by multiplying the correction rate (see FIG. 11) by the reflection rate (see FIG. 12) which increases in accordance with a lapse of time, and is a parameter that indicates a degree by which adjustment of reducing the speed with respect to the above-described reference movement speed is performed. The adjustment rate may be referred to as a reflection coefficient.

In the graph in FIG. 13, an adjustment rate of 0% corresponds to a movement speed (i.e., the reference movement speed) at the time when adjustment of reducing the speed with respect to the reference movement speed is not performed. In the graph in FIG. 13, a solid line A is the movement speed of the shuttle 200 hit by the own character 202 in the virtual space (game image) of the own apparatus, and corresponds to a movement speed (which may be referred to as "adjustment movement speed") obtained by performing adjustment of reducing the speed with respect to the reference movement speed. A solid line B at the adjustment rate of 0% corresponds to the movement speed (i.e., the reference movement speed) of the shuttle 200 hit by the opponent character 203 (i.e., hit by the own character 202 in the own apparatus), in the virtual space (game image) of the opponent apparatus.

At T1 in the graph in FIG. 13, when the own character 202 has hit a shot (a shot other than a miss shot and a super smash), adjustment of reducing the movement speed of the shuttle 200 with respect to the reference movement speed is executed. Specifically, in the virtual space of the own apparatus, over a period (flight time, arrival time) from T1 at which the shuttle 200 has been hit and starts moving to T5 at which the shuttle 200 reaches the ground, the shuttle 200 is caused to move at the adjustment movement speed (the solid line A) obtained by multiplying the reference movement speed by the adjustment rate (correction rate×reflection rate). In FIG. 13, as an example, a case where the correction rate shown in FIG. 11 is 50% is shown. T3 in FIG. 13 corresponds to a time (T1 in FIG. 12) at which the reflection rate becomes 100%, and is a time at which reflection of the correction rate of 50% is completed.

As shown in FIG. 13, in the virtual space (game image) of the opponent apparatus, (as already described with reference to FIG. 9), the shuttle 200 starts moving at T2 which is late by RTT/2 from T1, and the shuttle 200 reaches the ground at T4 which is early by RTT/2 from T5 (see the solid line B).

As described above, in the virtual space (game image) of the own apparatus, with respect to shots other than a miss shot and a super smash, the adjustment rate is gradually increased in a period from when the shuttle 200 has started moving to a predetermined timing (T3), whereby the movement speed is gradually reduced from the reference movement speed. Then, after the predetermined timing (T3), the adjustment rate is fixed, and the movement speed is uniformly reduced from the reference movement speed. Accordingly, while preventing unnatural display described with reference to FIG. 10, it is possible to prevent display, that causes a feeling of strangeness, in which the movement speed of the shuttle 200 is rapidly reduced immediately after the shot has been hit, and it is possible to maintain a refreshing feeling at the time of hitting a shot.

FIG. 14 is an example of a graph for describing adjustment in which the speed of a miss shot or a super smash hit by the own character 202 is reduced with respect to the original movement speed (reference movement speed) in the virtual space (game image) of the own apparatus. The graph in FIG. 14 is different from the graph in FIG. 13 in that a solid line A is a straight line. Specifically, in the graph in FIG. 14, the reflection rate is always fixed to 100%, whereby the adjustment rate (correction rate×reflection rate) is fixed. Therefore, when the own character 202 has hit a miss shot or a super smash, adjustment of always uniformly reducing the movement speed of the shuttle 200 with respect to the reference movement speed is executed. For fixation of the adjustment rate, another calculation formula or process may be used.

As described above, in the virtual space (game image) of the own apparatus, with respect to a miss shot or a super smash, while the adjustment rate is fixed over the entire flight time of the shuttle 200, the movement speed is uniformly reduced from the reference movement speed. Here, a super smash has a reference movement speed faster than that of a smash, and is a fastest shot. Therefore, even if adjustment of always uniformly reducing the speed with respect to the reference movement speed as shown in FIG. 14 is performed, the display does not cause a feeling of strangeness. Further, since a miss shot is a slowest shot, even if adjustment of always uniformly reducing the speed with respect to the reference movement speed as shown in FIG. 14 is performed, the display does not cause a feeling of strangeness. Therefore, with respect to the miss shot and the super smash, display that causes a feeling of strangeness is not caused due to adjustment of always uniformly reducing the speed with respect to the reference movement speed, and unnatural display described with reference to FIG. 10 can be prevented.

As described above, in the exemplary embodiment, the adjustment method of the movement speed of the shuttle 200 is made different in accordance with the type of the shot, whereby display that causes a feeling of strangeness is not performed, and unnatural display described with reference to FIG. 10 is prevented.

The adjustment rate (correction rate×reflection rate) indicated by the solid line A in FIG. 13 may be referred to as "first correction value", and the reflection rate used to calculate the adjustment rate (correction rate×reflection rate) indicated by the solid line A in FIG. 13 may be referred to as "first correction value". Further, the adjustment rate (correction rate×reflection rate) indicated by the solid line A in FIG. 14 may be referred to as "second correction value", and the reflection rate used to calculate the adjustment rate (correction rate×reflection rate) indicated by the solid line A in FIG. 14 may be referred to as "second correction value".

Figure 15:
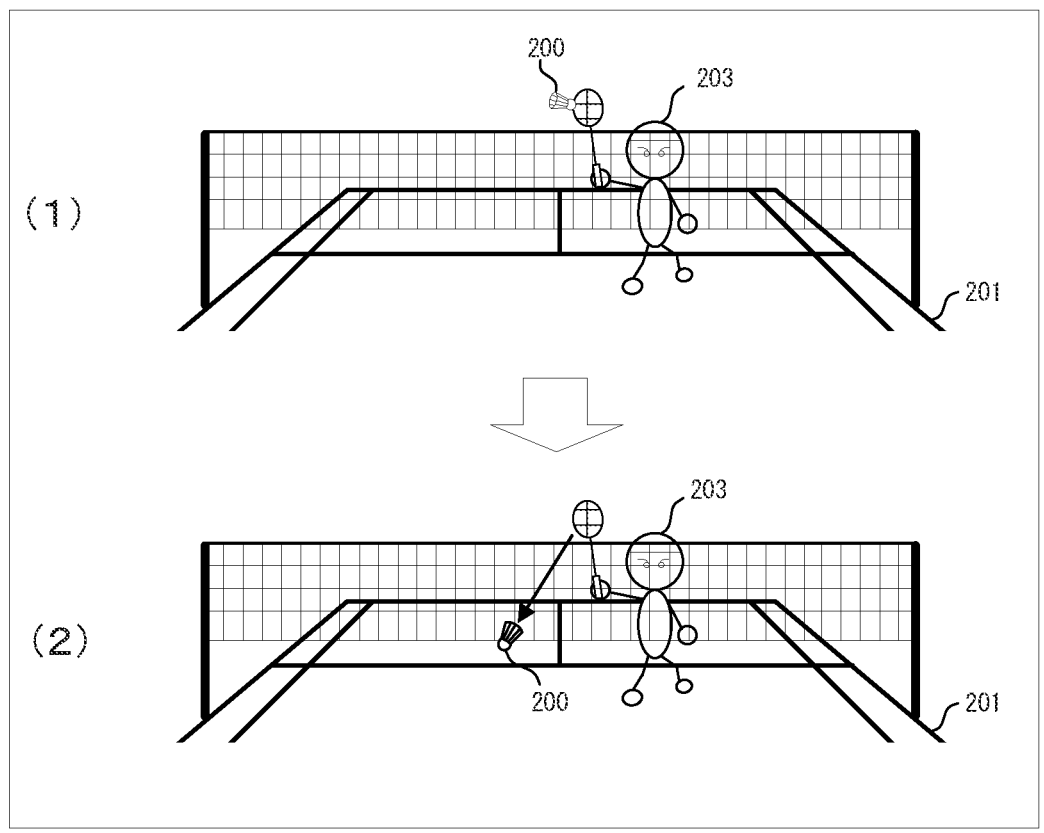
FIG. 15 is a diagram for describing a non-limiting example of a badminton game image.

FIG. 15 is a diagram for describing display of a game image of the own apparatus obtained when unnatural display described with reference to FIG. 10 is prevented through the above-described process. As shown in FIG. 15, in the virtual space (game image) of the own apparatus, as a result of the speed reduction adjustment of the shuttle 200, before the shuttle 200 passes through the position of the opponent character 203 (see (1) of FIG. 15), the opponent character 203 hits back the shot (see (2) of FIG. 15). Thus, unnatural display of a game image described with reference to FIG. 10 can be prevented.

Details of Information Processing in the Exemplary Embodiment

Next, with reference to FIG. 13 to FIG. 16, information processing in the exemplary embodiment will be described in detail.

[Data to be Used]

Figure 16:
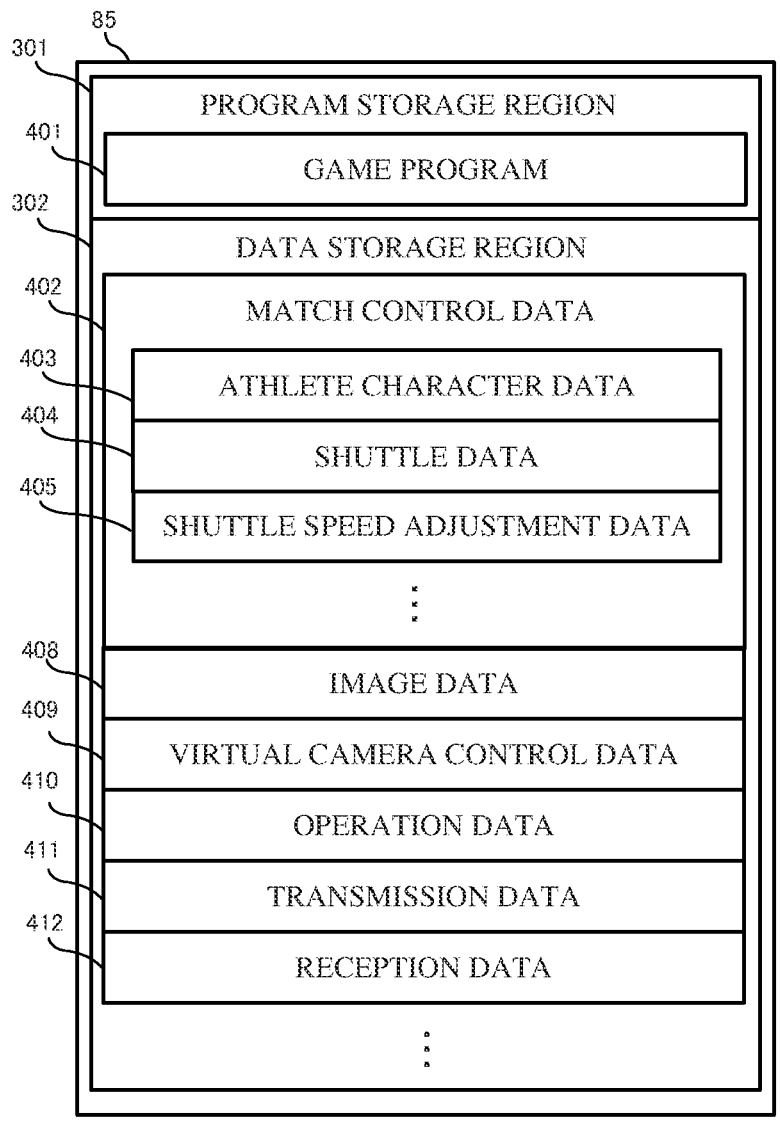
FIG. 16 shows a non-limiting example of various types of data stored in a DRAM 85.

Various types of data used in this game processing will be described. FIG. 16 shows an example of data stored in the DRAM 85 of the game system 1. As shown in FIG. 16, the DRAM 85 is provided with at least a program storage region 301 and a data storage region 302. A game program 401 is stored in the program storage region 301. Match control data 402, image data 408, virtual camera control data 409, operation data 410, transmission data 411, reception data 412, and the like are stored in the data storage region 302. The match control data 402 includes athlete character data 403, shuttle data 404, shuttle speed adjustment data 405, and the like.

The game program 401 is a game program for executing this game processing.

The athlete character data 403 is data regarding athlete characters. The athlete character data 403 includes various types of data for controlling motions of athlete characters during a match, such as the current positions and orientations, the current motion states, and the like of the own character 202 and the opponent character 203.

The shuttle data 404 is data regarding the shuttle 200. The shuttle data 404 includes various types of data for controlling motion of the shuttle 200, such as the position, movement direction, movement path, original movement speed (reference movement speed), and the like of the shuttle 200. In addition, the shuttle data 404 includes information indicating whether or not the shot is a miss shot.

The shuttle speed adjustment data 405 is data for performing movement speed adjustment (movement speed adjustment of the shuttle 200 in the virtual space of the own apparatus) of the shuttle 200 described with reference to FIG. 11 to FIG. 14, and the like. Specifically, the shuttle speed adjustment data 405 is data and the like for determining a correction rate and a reflection rate (see FIG. 11, FIG. 12).

The image data 408 is image data of athlete characters, a shuttle, a badminton court, and the like.

The virtual camera control data 409 is data for controlling motion of the virtual camera placed in the virtual space. Specifically, the virtual camera control data 409 is data that designates the position/orientation, angle of view, imaging direction, and the like of the virtual camera.

The operation data 410 is data indicating the contents of operations performed on the left controller 3 and the right controller 4. For example, data that indicates motions and orientation changes of the left controller 3 and the right controller 4, and input states regarding press states and the like of various types of buttons, is included. The contents of the operation data is updated at a predetermined cycle on the basis of signals from the left controller 3 and the right controller 4.

The transmission data 411 is data to be transmitted to another game system 1, and is data including at least information for identifying the transmission source, and the contents of the operation data 410.

The reception data 412 is data stored such that transmission data received from other game systems 1 (i.e., transmission sources) can be discerned for each of the other game systems 1.

Other than the above, various types of data to be used in game processing is stored as necessary in the DRAM 85.

[Details of Game Processing]

Figure 17:
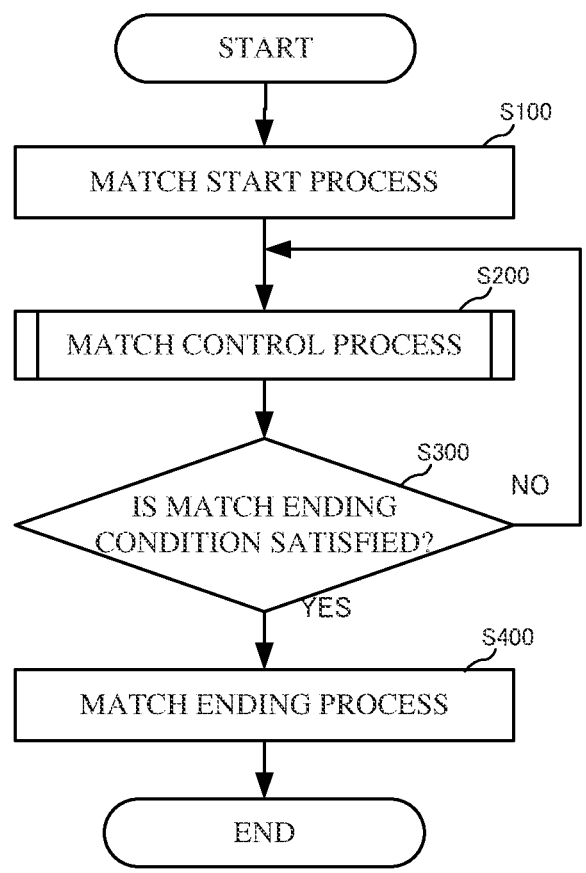
FIG. 17 is a non-limiting example of a flowchart of game processing.
Figure 18:
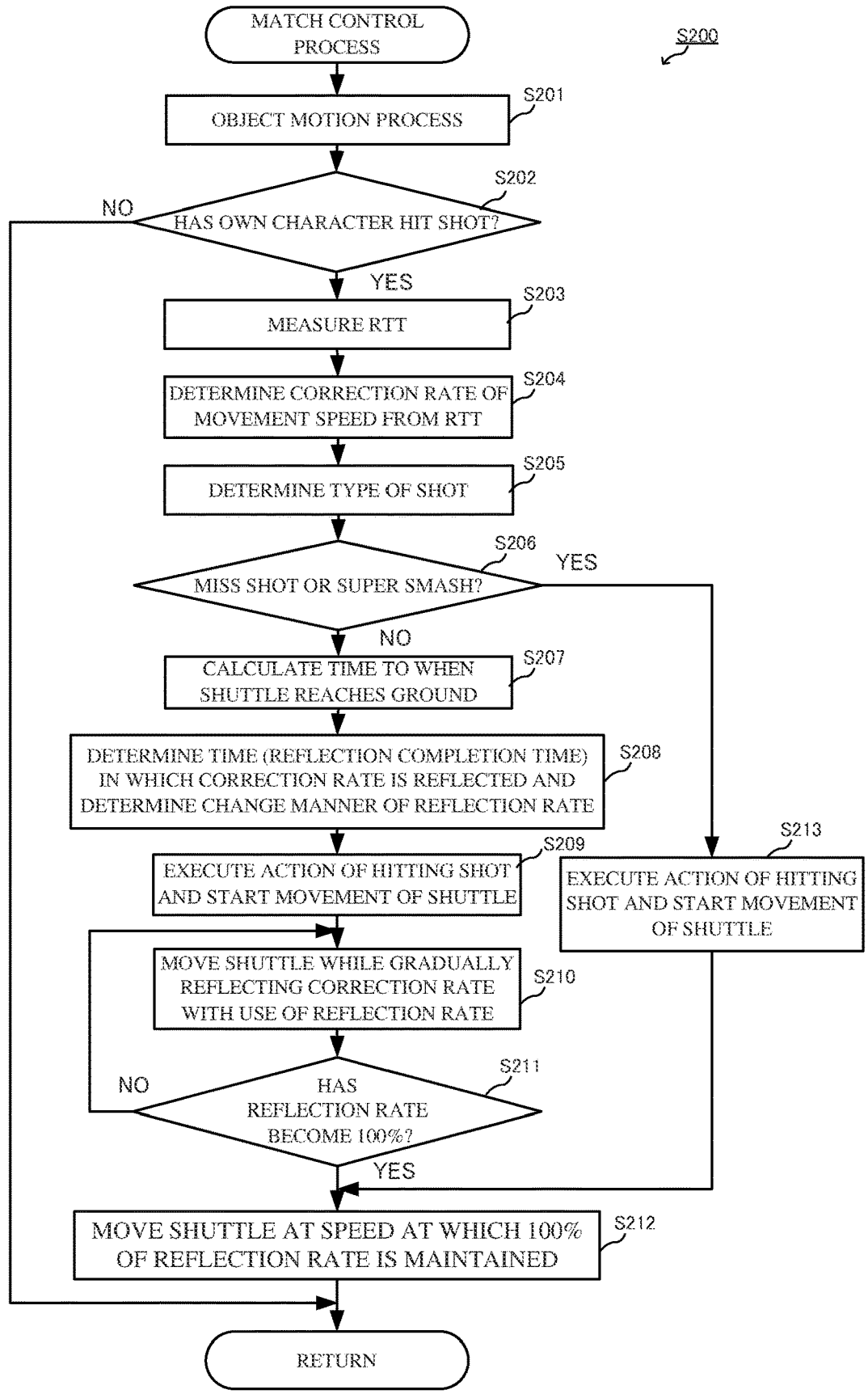
FIG. 18 is a non-limiting example of a flowchart of the game processing.

Next, with reference to flowcharts, game processing according to the exemplary embodiment will be described in detail. FIG. 17 and FIG. 18 are each an example of a flowchart showing details of the game processing according to the exemplary embodiment.

First, upon start of this game processing, the processor 81 performs a match start process in step S100 in FIG. 17. For example, the processor 81 displays, on a display section (e.g., stationary monitor), a representation showing the start of a match. Then, the process proceeds to step S200.

In step S200, the processor 81 performs a match control process. FIG. 18 is an example of a flowchart showing the match control process. Hereinafter, the match control process will be described with reference to FIG. 18. In the following, a typical process in this game processing will be described with reference to FIG. 18. However, during execution of the match control process and the like, acquisition of operation data, control of each object in the virtual space, display of an image, and the like are performed in each frame (i.e., at a predetermined time interval).

In step S201 in FIG. 18, the processor 81 performs an object motion process. For example, on the basis of the operation data 410, the processor 81 performs a control of causing the own character 202 to perform a motion of hitting a shot and of moving the shuttle 200 in accordance with the shot. For example, the processor 81 performs a control (automatic movement control) of automatically moving the own character 202 to a position at which the own character 202 should hit back the shot hit by the opponent character 203. For example, the processor 81 transmits/receives data, to/from the opponent apparatus, that indicates the position, orientation, motion (e.g., an action of hitting a shot), and the like of an athlete character (the own character 202 or the opponent character 203) at a predetermined time interval (e.g., at a 10-millisecond interval), and synchronizes the position, orientation, action, and the like of the athlete character between the virtual space of the own apparatus and the virtual space of the opponent apparatus. In this manner, the processor 81 performs a process of causing the own character 202, the opponent character 203, the shuttle 200, and the like to perform motions in the virtual space of the own apparatus. Then, the process proceeds to step S202.

In step S202, the processor 81 determines whether or not the own character 202 has hit a shot, on the basis of the operation data 410 and the like. Specifically, the processor 81 determines whether or not a swinging operation of the controller has been performed at a shot success timing or a miss shot timing. The shot success timing is a predetermined timing (e.g., a timing at which the distance between the own character 202 and the shuttle 200 is less than 1 meter) at which a shot is normally and successfully hit. When a swinging operation of the controller is performed at the shot success timing, a shot (a shot other than a miss shot) is successfully hit. The miss shot timing is a predetermined timing (e.g., a timing at which the distance between the own character 202 and the shuttle 200 is not less than 1 meter and not greater than 1.3 meters) at which hitting a shot in a normal manner fails but a miss shot is successfully hit. When a swinging operation of the controller is performed at the miss shot timing, a miss shot is hit. When the determination in step S202 is YES, the process proceeds to step S203, and when this determination is NO, the process proceeds to step S300 in FIG. 17.

In step S203, the processor 81 measures the RTT. Then, the process proceeds to step S204. The timing of measuring the RTT may be any timing before a correction rate is determined in the process in step S204 below.

In step S204, on the basis of the shuttle speed adjustment data 405, the processor 81 determines, as described with reference to FIG. 11, a correction rate in accordance with the RTT measured in step S203. Then, the process proceeds to step S205.

In step S205, on the basis of the operation data 410, the shuttle data 404, and the like, the processor 81 determines the type of the shot determined in step S202. Specifically, when an operation of hitting by an underhand stroke of swinging up the controller has been performed, the processor 81 determines the type of the shot to be a lob. When an operation of hitting by an overhand stroke of swinging down the controller has been performed and the shuttle position at the time when the controller has been swung is less than a predetermined height, the processor 81 determines the type of the shot to be a clear. When an operation of hitting by an overhand stroke of swinging down the controller has been performed and the shuttle position at the time when the controller has been swung is not less than the above predetermined height, the processor 81 determines the type of the shot to be a smash. When the operation of hitting a smash described above has been performed and the shot that is to be hit back is a miss shot, the processor 81 determines the type of the shot to be a super smash. When an operation of hitting by an overhand stroke or an underhand stroke has been performed and the operation has been performed at the miss shot timing, the processor 81 determines the type of the shot to be a miss shot. Then, the process proceeds to step S206.

In step S206, the processor 81 determines whether or not the type of the shot determined in step S205 is a miss shot or a super smash. When the determination in step S206 is YES, the process proceeds to step S213, and when this determination is NO, the process proceeds to step S207.

In step S207, on the basis of the shuttle data 404 and the like, the processor 81 calculates a time (flight time, arrival time) from when the shot determined in step S205 has been hit to when the shot reaches the ground. Specifically, on the basis of a movement path of the shuttle 200 corresponding to the type of the shot determined in step S205, the RTT (see FIG. 13) measured in step S203, and the like, the processor 81 calculates a time from when the shot has been hit to when the shot reaches the ground. Then, the process proceeds to step S208.

In step S208, on the basis of the flight time calculated in step S207, the processor 81 determines a time (reflection completion time; see FIG. 12 and FIG. 13) in which the correction rate is reflected up to 100% to the reference movement speed, and determines a change manner (see FIG. 12) of the reflection rate. Specifically, the processor 81 determines, as the reflection completion time, a time (e.g., a time corresponding to 40%) corresponding to a predetermined proportion of the above flight time, and determines a change manner of the reflection rate. Then, the process proceeds to step S209.

In step S209, the processor 81 causes the own character 202 to execute an action (an action of hitting a shot other than a miss shot and a super smash) of hitting the shuttle 200 and starts movement of the shuttle 200 toward the movement path, in the virtual space (game image) of the own apparatus. Then, the process proceeds to step S210.

In step S210, the processor 81 moves the shuttle while gradually reflecting the correction rate with use of the reflection rate. Specifically, the processor 81 moves the shuttle 200 along the movement path in the virtual space of the own apparatus, while gradually reflecting the correction rate determined in step S204 to the reference movement speed in accordance with the change manner (see FIG. 12) of the reflection rate determined in step S208, as described with reference to FIG. 11 to FIG. 13 (see the period from T1 to T3 in FIG. 13). Then, the process proceeds to step S211.

In step S211, the processor 81 determines whether or not the reflection rate reflected in step S210 has become 100%, in other words, determines whether or not the reflection completion time indicated by T1 in FIGS. 12 and T3 in FIG. 13 has elapsed. When the determination in step S211 is YES, the process proceeds to step S212, and when this determination is NO, the process returns to step S210.

Meanwhile, in step S213, the processor 81 causes the own character 202 to execute an action (an action of hitting a miss shot or a super smash) of hitting the shuttle 200 and starts movement of the shuttle 200 toward the movement path, in the virtual space of the own apparatus. Then process proceeds to step S212.

In step S212, the processor 81 moves the shuttle 200 along the movement path at a speed at which 100% of the reflection rate is maintained, in the virtual space of the own apparatus (see the period from T3 to T5 in FIG. 13 and the period from T1 to T5 in FIG. 14). Then, the process proceeds to step S300 in FIG. 17.

In step S300 in FIG. 17, the processor 81 determines whether or not a match ending condition, such as the own character 202 or the opponent character 203 having acquired a point with which the match ends, has been satisfied. When this determination is YES, the process proceeds to step S400, and when this determination is NO, the process returns to step S200.

In step S400, the processor 81 performs a match ending process such as displaying a representation indicating the end of the match on the display section. Then, this game processing ends.

As described above, according to the exemplary embodiment (see FIG. 13), in the virtual space (game image) of the own apparatus, with respect to a shot other than a miss shot and a super smash, the adjustment rate is gradually increased in a period from when the shuttle 200 has started moving to a predetermined timing (T3), whereby the movement speed is gradually reduced from the reference movement speed. Then, after the predetermined timing (T3), the adjustment rate is fixed, and the movement speed is uniformly reduced from the reference movement speed. Accordingly, while preventing unnatural display described with reference to FIG. 10, it is possible to prevent display, that causes a feeling of strangeness, in which the movement speed of the shuttle 200 is rapidly reduced immediately after the shot has been hit, and it is possible to maintain a sense of speed (refreshing feeling) of the shuttle 200 immediately after the shot has been hit.

According to the exemplary embodiment (see FIG. 14), in the virtual space (game image) of the own apparatus, with respect to a miss shot or a super smash, while the adjustment rate is fixed over the entire flight time of the shuttle 200, the movement speed is uniformly reduced from the reference movement speed. Here, a super smash has a reference movement speed faster than that of a smash, and is a fastest shot. Therefore, even if adjustment of always uniformly reducing the speed with respect to the reference movement speed as shown in FIG. 14 is performed, the display does not cause a feeling of strangeness. Further, since a miss shot is a slowest shot, even if adjustment of always uniformly reducing the speed with respect to the reference movement speed as shown in FIG. 14 is performed, the display does not cause a feeling of strangeness. Therefore, with respect to the miss shot and the super smash, display that causes a feeling of strangeness is not caused due to adjustment of always uniformly reducing the speed with respect to the reference movement speed, and unnatural display described with reference to FIG. 10 can be prevented.

As described above, according to the exemplary embodiment, the adjustment method of the movement speed of the shuttle 200 is made different in accordance with the type of the shot, whereby display that causes a feeling of strangeness is prevented, and at the same time, unnatural display described with reference to FIG. 10 can be prevented.

Modification

In the exemplary embodiment described above, a badminton game is described as an example. However, not limited thereto, the game may be a tennis game, a table tennis game, a volleyball game, or the like, for example.

In the exemplary embodiment described above, in the virtual space (game image) of the own apparatus, the opponent character 203 is controlled in accordance with data received from the opponent apparatus. However, for example, in the virtual space of the own apparatus, the opponent character 203 may be, ordinarily, controlled in accordance with data received from the opponent apparatus, and in a specific case, the opponent character 203 (e.g., motion, position, and the like of the opponent character 203) may be adjusted on the basis of received data.

In the exemplary embodiment described above, in the virtual space of the own apparatus, the movement direction and movement path of the shuttle hit by the own character 202 is determined in accordance with the operation data (see S202, S209, and the like in FIG. 18). However, the movement direction and movement path of the shuttle may be determined in accordance with an action of hitting a shot by the own character 202. For example, a form (type, etc.) of an action of hitting a shot is determined in accordance with operation data, and in accordance with the determined form of the action, the movement direction and movement path of the shuttle may be determined.

In the exemplary embodiment described above, the latest RTT measured at the timing at which the own character 202 hits a shot is used (see S202, S203, and the like in FIG. 18). However, for example, an average value of a predetermined number of RTTs measured immediately before the timing at which the own character 202 hits the shot may be used. Alternatively, for example, an average value of RTTs periodically measured may be used.

In the exemplary embodiment, a case in which a series of processes regarding the game processing are executed in a single game apparatus (main body apparatus) 2 has been described. In another exemplary embodiment, the series of processes may be executed in an information processing system including a plurality of information processing apparatuses. For example, in an information processing system including a terminal-side apparatus and a server-side apparatus communicable with the terminal-side apparatus via a network, some of the series of processes above may be executed by the server-side apparatus. Further, in an information processing system including a terminal-side apparatus and a server-side apparatus communicable with the terminal-side apparatus via a network, major processes among the series of processes above may be executed by the server-side apparatus, and some of the processes may be executed in the terminal-side apparatus. Further, in the above information processing system, the system on the server side may be implemented by a plurality of information processing apparatuses, and processes that should be executed on the server side may be shared and executed by a plurality of information processing apparatuses. Further, a configuration of a so-called cloud gaming may be adopted. For example, a configuration may be adopted in which: the game apparatus (main body apparatus) 2 sends operation data indicating operations performed by the user to a predetermined server; various game processes are executed in the server; and the execution result is streaming-distributed as a moving image/sound to the game apparatus (main body apparatus) 2.

While the exemplary embodiment has been described in detail, the foregoing description is in all aspects illustrative and not restrictive. It is to be understood that various modifications and variations can be made without departing from the scope of the exemplary embodiment.

What is claimed is:

1. A non-transitory computer-readable storage medium having stored therein instructions that, when executed by a processor of a first information processing apparatus, cause the first information processing apparatus to perform operations comprising:

communicating with a second information processing apparatus;

controlling, in a virtual space, an own character object controlled based on operation data acquired from at least one operation device which is related to the first information processing apparatus, an opponent character object controlled based on data received from the second information processing apparatus, and a movement object;

calculating a delay time in communication with the second information processing apparatus;

when the operation data acquired from the operation device satisfies a predetermined condition, causing the own character object to execute a first action with respect to the movement object in the virtual space and starting movement of the movement object, based on the operation data;

in a first case, based on a first correction value that is calculated based on the delay time and that is changed in accordance with a time having elapsed from when the movement of the movement object has been started, reducing a movement speed of the movement object of which the movement has been started, to move the movement object, and in a second case, based on a second correction value that is calculated based on the delay time and that is not changed in accordance with a time having elapsed from when the movement of the movement object has been started, reducing the movement speed of the movement object to move the movement object; and based on data received from the second information processing apparatus, causing the opponent character object to execute a second action with respect to the movement object that is being moved.

2. The non-transitory storage medium according to claim 1, wherein the operations include performing speed reduction on the movement object such that a reduction amount of the movement speed of the movement object is increased in accordance with increase in the delay time.

3. The non-transitory storage medium according to claim 1, wherein the operations include performing, in the first case, speed reduction on the movement object by changing the first correction value based on a reflection rate that is changed in accordance with a time having elapsed from when the movement of the movement object has been started.

4. The non-transitory storage medium according to claim 1, wherein the first correction value is changed, until a predetermined timing, such that the movement speed of the movement object is more reduced in accordance with a lapse of time, and is fixed after the predetermined timing.

5. The non-transitory storage medium according to claim 4, wherein;
the operations include calculating an arrival time that is taken until the movement object of which the movement has been started reaches a predetermined position, and
the first correction value is changed in accordance with a lapse of time until the predetermined timing calculated based on the arrival time, and is fixed after the predetermined timing.

6. The non-transitory storage medium according to claim 1, wherein the operations include:
further reducing, in the first case, based on the first correction value, a first movement speed of the movement object, the first movement speed decreasing in accordance with a lapse of time, and
further reducing, in the second case, based on the second correction value, a second movement speed of the movement object, the second movement speed decreasing in accordance with a lapse of time.

7. The non-transitory storage medium according to claim 6, wherein the operations include setting the first movement speed in the first case to be slower than the second movement speed in the second case, and then, reducing the second movement speed based on the second correction value.

8. The non-transitory storage medium according to claim 6, wherein the operations include setting the second movement speed in the second case to be slower than the first movement speed in the first case, and then, reducing the second movement speed based on the second correction value.

9. The non-transitory storage medium according to claim 1, wherein;
the operation device includes an inertial sensor, and
the operation data includes data based on an output from the inertial sensor.

10. The non-transitory storage medium according to claim 1, wherein the operations include executing a badminton game.

11. The non-transitory storage medium according to claim 1, wherein the operations include:
starting the movement of the movement object toward a movement path determined based on the operation data, and
moving the movement object along the movement path while reducing the movement speed of the movement object.

12. An information processing system of a first information processing apparatus comprising:
a processor and a memory coupled thereto, the processor being configured to control the information processing system to at least:
communicate with a second information processing apparatus;
control, in a virtual space, an own character object controlled based on operation data acquired from at least one operation device which is related to the first information processing apparatus, an opponent character object controlled based on data received from the second information processing apparatus, and a movement object;
calculate a delay time in communication with the second information processing apparatus;
when the operation data acquired from the operation device satisfies a predetermined condition, cause the own character object to execute a first action with respect to the movement object in the virtual space, and start movement of the movement object, based on the operation data;
in a first case, based on a first correction value that is calculated based on the delay time and that is changed in accordance with a time having elapsed from when the movement of the movement object has been started, reduce a movement speed of the movement object of which the movement has been started, to move the movement object, and in a second case, based on a second correction value that is calculated based on the delay time and that is not changed in accordance with a time having elapsed from when the movement of the movement object has been started, reduce the movement speed of the movement object to move the movement object; and
based on data received from the second information processing apparatus, cause the opponent character object to execute a second action with respect to the movement object that is being moved.

13. A first information processing apparatus comprising:
a processor and a memory coupled thereto, the processor being configured to control the first information processing apparatus to at least:
communicate with a second information processing apparatus;
control, in a virtual space, an own character object controlled based on operation data acquired from at least one operation device which is related to the first information processing apparatus, an opponent character object controlled based on data received from the second information processing apparatus, and a movement object;
calculate a delay time in communication with the second information processing apparatus;
when the operation data acquired from the operation device satisfies a predetermined condition, cause the own character object to execute a first action with respect to the movement object in the virtual space, and start movement of the movement object, based on the operation data;
in a first case, based on a first correction value that is calculated based on the delay time and that is changed in accordance with a time having elapsed from when the movement of the movement object has been started, reduce a movement speed of the movement object of which the movement has been started, to move the movement object, and in a second case, based on a second correction value that is calculated based on the delay time and that is not changed in accordance with a time having elapsed from when the movement of the movement object has been started, reduce the movement speed of the movement object to move the movement object; and based on data received from the second information processing apparatus, cause the opponent character object to execute a second action with respect to the movement object that is being moved.

14. The first information processing apparatus according to claim 13, wherein in the first case, speed reduction is performed on the movement object by changing the first correction value based on a reflection rate that is changed in accordance with a time having elapsed from when the movement of the movement object has been started.

15. The first information processing apparatus according to claim 13, wherein the first correction value is changed, until a predetermined timing, such that the movement speed of the movement object is more reduced in accordance with a lapse of time, and is fixed after the predetermined timing.

16. The first information processing apparatus according to claim 15, wherein:
an arrival time that is taken until the movement object of which the movement has been started reaches a predetermined position is calculated, and
the first correction value is changed in accordance with a lapse of time until the predetermined timing calculated based on the arrival time, and is fixed after the predetermined timing.

17. An information processing method executed by a processor configured to control an information processing system of a first information processing apparatus, the information processing method comprising:
communicating with a second information processing apparatus;
controlling in a virtual space, an own character object controlled based on operation data acquired from at least one operation device which is related to the first information processing apparatus, an opponent character object controlled based on data received from the second information processing apparatus, and a movement object;
calculating a delay time in communication with the second information processing apparatus;
when the operation data acquired from the operation device satisfies a predetermined condition, causing the own character object to execute a first action with respect to the movement object in the virtual space, and starting movement of the movement object, based on the operation data;
in a first case, based on a first correction value that is calculated based on the delay time and that is changed in accordance with a time having elapsed from when the movement of the movement object has been started, reducing a movement speed of the movement object of which the movement has been started, to move the movement object, and in a second case, based on a second correction value that is calculated based on delay time and that is not changed in accordance with a time having elapsed from when the movement of the movement object has been started, reducing the movement speed of the movement object to move the movement object; and
based on data received from the second information processing apparatus, causing the opponent character object to execute a second action with respect to the movement object that is being moved.

18. The information processing method according to claim 17, wherein in the first case, speed reduction is performed on the movement object by changing the first correction value based on a reflection rate that is changed in accordance with a time having elapsed from when the movement of the movement object has been started.

19. The information processing method according to claim 17, wherein the first correction value is changed, until a predetermined timing, such that the movement speed of the movement object is more reduced in accordance with a lapse of time, and is fixed after the predetermined timing.

20. The information processing method according to claim 19, wherein:
an arrival time that is taken until the movement object of which the movement has been started reaches a predetermined position is calculated, and
the first correction value is changed in accordance with a lapse of time until the predetermined timing calculated based on the arrival time, and is fixed after the predetermined timing.

* * * * *